United States Patent
Ling et al.

(10) Patent No.: US 7,715,623 B2
(45) Date of Patent: May 11, 2010

(54) DIFFUSION DISTANCE FOR HISTOGRAM COMPARISON

(75) Inventors: Haibin Ling, College Park, MD (US); Kazunori Okada, Los Angeles, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 849 days.

(21) Appl. No.: 11/598,538

(22) Filed: Nov. 13, 2006

(65) Prior Publication Data

US 2007/0110306 A1 May 17, 2007

Related U.S. Application Data

(60) Provisional application No. 60/736,388, filed on Nov. 14, 2005.

(51) Int. Cl.
*G06K 9/00* (2006.01)
*G06K 9/38* (2006.01)
*G06K 9/46* (2006.01)

(52) U.S. Cl. ........................ 382/168; 382/252

(58) Field of Classification Search ............... 382/130, 382/167, 168, 172, 181, 203, 209, 210, 218–220, 382/254, 260–264; 358/3.23, 466, 518, 534, 358/535

See application file for complete search history.

(56) References Cited

U.S. PATENT DOCUMENTS

| | | | | |
|---|---|---|---|---|
| 5,696,595 A | * | 12/1997 | Yamanishi | 358/3.23 |
| 5,710,827 A | * | 1/1998 | Perumal et al. | 382/167 |
| 5,872,867 A | * | 2/1999 | Bergen | 382/254 |
| 6,009,193 A | * | 12/1999 | Mita | 382/168 |
| 6,233,360 B1 | * | 5/2001 | Metcalfe et al. | 382/252 |
| 7,006,692 B2 | * | 2/2006 | Matsushima | 382/168 |
| 7,013,044 B2 | * | 3/2006 | Wang | 382/168 |
| 2007/0110306 A1 | * | 5/2007 | Ling et al. | 382/168 |

OTHER PUBLICATIONS

Odaka, et al, "$EMD\text{-}L_1$: An Efficient and Robust Algorithm for Comparing Histogram-Based Descriptors", ECCV 2006 Submission 621.

(Continued)

*Primary Examiner*—Amir Alavi
(74) *Attorney, Agent, or Firm*—Donald B. Paschburg

(57) ABSTRACT

A new measure to compare histogram-based descriptors, a diffusion distance, is disclosed. The difference between two histograms is defined to be a temperature field. The relationship between histogram similarity and diffusion process is discussed and it is shown how the diffusion handles deformation as well as quantization effects. As a result, the diffusion distance is derived as the sum of dissimilarities over scales. Being a cross-bin histogram distance, the diffusion distance is robust to deformation, lighting change and noise in histogram-based local descriptors. In addition, it enjoys linear computational complexity which significantly improves previously proposed cross-bin distances with quadratic complexity or higher The proposed approach is tested on both shape recognition and interest point matching tasks using several multi-dimensional histogram-based descriptors including shape context, SIFT and spin images. In all experiments, the diffusion distance performs excellently in both accuracy and efficiency in comparison with other state-of-the-art distance measures. In particular, it performs as accurate as the Earth Mover's Distance with a much greater efficiency.

18 Claims, 9 Drawing Sheets

OTHER PUBLICATIONS

S. Belongie, J. Malik and J. Puzicha. "Shape Matching and Object Recognition Using Shape Context", *IEEE Trans. on PAMI*, 24(24):509-522, 2002.

K. Grauman and T. Darrell, "Fast Contour Matching Using Approximate Earth Mover's Distance", *CVPR*, 1:220-227, 2004.

K. Grauman and T. Darrell. "The Pyramid Match Kernel; Discriminative classification with Sets of Image Features" *ICCV*, 2005.

J. Hafner, H. S. Sawhney, W. Equitz, M. Flickner, and W. Niblack. "Efficient color histogram indexing for quadratic form distance functions", *IEEE Trans. on PAMI*, 17(7):729-736, 1995.

C. Harris and M. Stephens, "A combined corner and edge detector", *Alvey Vision Conference*, 147-151, 1988.

P. Indyk and N. Thaper, "Fast Image Retrieval via Embeddings", *In 3rd Workshop on Statistical and computational Theories of Vision*, Nice, France, 2003.

A. Johnson, M. Hebert, "Using spin images for efficient object recognition in cluttered 3D scenes". *IEEE Trans. on PAMI*, 21(5):433-449, 1999.

S. Lazebnik, C. Schmid, and J. Ponce, "A sparse texture representation using affine-invariant regions," *IEEE Trans. PAMI*, 27(8):1265-1278, 2005.

J. Lin. "Divergence measures based on the Shannon entropy". *IEEE Trans. Inform. Theory*, 37(1):145-151, 1991.

T. Lindeberg. "Feature Detection with Automatic Scale Selection", *IJCV*, 30(2):79-116, 1998.

H. Ling and D. W. Jacobs, "Using the Inner-Distance for classification of Articulated Shapes", *CVPR*, II:719-726, 2005.

D. Lowe, "Distinctive Image Features from Scale-Invariant Keypoints," *IJCV*, 60(2), pp. 91-110, 2004.

K. Mikolajczyk and C. Schmid, "A Performance Evaluation of Local Descriptors," *IEEE Trans. on PAMI*, 27(10):1615-1630, 2005.

E.N. Mortensen, H. Deng, and L. Shapiro, "A SIFT Description with Global Context," CVPR, I:184-190, 2005.

W. Niblack, R. Barber, W. Equitz, M. Flickner, B. Glasman, D. Pektovic, P. Yanker, C. Faloutsos, and G. Taubin. The QBIC project: querying images by content using color, texture and shape. *In Proc. of SPIE Storage and Retrieval for Image and Video Databases*, pp. 173-187, 1993.

P. Perona and J. Malik. "Scale-Space and Edge Detection Using Anisotropic Diffusion". *IEEE Trans. on PAMI*, 12(7):629-639, 1990.

Y. Rubner, J. Puzicha, C. Tomasi, and J. M. Buhmann. "Empirical Evaluation of Dissimilarity Measures for Color and Texture", *CVIU*, 84:25-43, 2001.

Y. Rubner, C. Tomasi, and L. J. Guibas. "The Earth Mover's Distance as a Metric for Image Retrieval", *IJCV*, 40(2):99-121, 2000.

M. J. Swain and D. H. Ballard. "Color Indexing", *IJCV*, 7(1):11-32, 1991.

A. Thayananthan, B. Stenger, P. H. S. Torr and R. Cipolla, "Shape Context and Chamfer Matching in Cluttered Scenes", *CVPR*, I:1063-6919, 2003.

\* cited by examiner

DIFFUSION DISTANCE FOR HISTOGRAM COMPARISON

STATEMENT OF RELATED CASES

This application claims the benefit of U.S. Provisional Application No. 60/736,388 filed Nov. 14, 2005, which is incorporated herein by reference.

BACKGROUND OF THE INVENTION

The present invention relates to computer vision. More specifically it relates to the use of histogram-based local descriptors (HBLD) in various computer vision tasks.

Histogram-based local descriptors (HBLD) are used in various computer vision tasks. These tasks include shape matching. See, for example, S. Belongie, J. Malik and J. Puzicha. "Shape Matching and Object Recognition Using Shape Context", IEEE Trans. on PAMI, 24(24):509-522, 2002; K. Grauman and T. Darrell, "Fast Contour Matching Using Approximate Earth Mover's Distance", CVPR, 1:220-227, 2004; H. Ling and D. W. Jacobs, "Using the Inner-Distance for classification of Articulated Shapes", CVPR, II:719-726, 2005; and A. Thayananthan, B. Stenger, P. H. S. Torr and R. Cipolla, "Shape Context and Chamfer Matching in Cluttered Scenes", CVPR, I:1063-6919, 2003. The tasks also include image retrieval. See, for example: D. Lowe, "Distinctive Image Features from Scale-Invariant Keypoints," IJCV, 60(2), pp. 91-110,2004; K. Mikolajczyk and C. Schmid, "A Performance Evaluation of Local Descriptors," IEEE Trans. on PAMI, 27(10):1615-1630, 2005; and E. N. Mortensen, H. Deng, and L. Shapiro, "A SIFT Description with Global Context," CVPR, I:184-190, 2005. The tasks further include texture analysis. See, for example, S. Lazebnik, C. Schmid, and J. Ponce, "A sparse texture representation using affine-invariant regions," IEEE Trans. PAMI, 27(8): 1265-1278, 2005.

HBLDs are very effective for these tasks because distributions capture rich information in local regions of objects. However, in practice, HBLDs often suffer from distortion problems due to deformation, illumination change and noise, as well as the quantization effect. See, Y. Rubner, C. Tomasi, and L. J. Guibas. "The Earth Mover's Distance as a Metric for Image Retrieval", IJCV, 40(2):99-121, 2000.

Comparison measures between histograms show similarities and dissimilarities between histograms. The measures can be categorized into bin-to-bin and cross-bin distances.

The most often used bin-to-bin distances between HBLDs (e.g. $\chi 2$ statistics, $L_2$ distance and Kullback-Leibler divergence) assume that the histograms are already aligned, so that a bin in one histogram is only compared to the corresponding bin in the other histogram. These methods are sensitive to the distortion in HBLDs as well as quantization effects. For example in FIG. 1, they falsely state that 102 is closer to 103 than to 101 wherein 104, 105 and 106 show corresponding histograms using the same 2D bins. Cross-bin distances, such as the Earth Mover's Distance (EMD) as described in, Y. Rubner, C. Tomasi, and L. J. Guibas. "The Earth Mover's Distance as a Metric for Image Retrieval", IJCV, 40(2):99-121, 2000, allow bins at different locations to be (partially) matched and therefore alleviate the quantization effect. However, most of the cross-bin distances are only efficient for one dimensional histograms which unfortunately limits their application to the multi-dimensional HBLDs such as shape context as described in S. Belongie, J. Maliic and J. Puzicha. "Shape Matching and Object Recognition Using Shape Context", IEEE Trans. on PAMI, 24(24):509-522, 2002, and SIFT as described in D. Lowe, "Distinctive Image Features from Scale-Invariant Keypoints," IJCV, 60(2), pp. 91-110, 2004, etc.

The approach of the present invention falls into the latter category, the cross-bin distances. In the following, cross-bin distances which are most related to the present invention are discussed.

The Earth Mover's Distance (EMD) proposed by Rubner et al. in Y. Rubner, C. Tomasi, and L. J. Guibas. "The Earth Mover's Distance as a Metric for Image Retrieval", IJCV, 40(2):99-121, 2000, defines the distance computation between distributions as a transportation problem. EMD is very effective for distribution with sparse structures, e.g., color histograms in the CIE-Lab space as in Y. Rubner, C. Tomasi, and L. J. Guibas. "The Earth Mover's Distance as a Metric for Image Retrieval", IJCV, 40(2):99-121, 2000. However, the time complexity of EMD is larger than $O(N^3)$ where N is the number of histogram bins. This prevents its application to multi-dimensional histogram-based descriptors such as the HBLDs.

Indyk and Thaper in "Fast Image Retrieval via Embeddings", In 3rd Workshop on Statistical and computational Theories of Vision, Nice, France, 2003, proposed a fast EMD algorithm by embedding the EMD metric into a Euclidean space. The embedding is performed using a hierarchical distribution analysis. EMD can be approximated by measuring the $L_1$ distance in the Euclidean space after embedding. The time complexity of the embedding is $O(Nd \log \Delta)$, where N is the size of feature sets, d is the dimension of the feature space and $\Delta$ is the diameter of the union of the two feature sets to be compared. The embedding approach is effectively applied to retrieval tasks as described in P. Indyk and N. Thaper, "Fast Image Retrieval via Embeddings", In 3rd Workshop on Statistical and computational Theories of Vision, Nice, France, 2003, and shape comparison as described in K. Grauman and T. Darrell, "Fast Contour Matching Using Approximate Earth Mover's Distance", CVPR, 1:220-227, 2004.

Most recently, Grauman and Darrell proposed in "The Pyramid Match Kernel; Discriminative classification with Sets of Image Features" ICCV, 2005, using the pyramid matching kernel for feature set matching. In this article, a pyramid of histograms of a feature set is extracted as a description of an object. Then the similarity between two objects is defined by a weighted sum of histogram intersections at each scale as described in M. J. Swain and D. H. Ballard. "Color Indexing", IJCV, 7(1):11-32, 1991. The diffusion process has widely been used for the purpose of data smoothing and scale-space analysis in the computer vision community. Some earlier work introducing this idea can be found in A. P. Witkin. "Scale-space filtering", IJCAI, pp. 1019-1022, 1983; and in J. J. Koenderink, "The structure of images", Biol. Cybern., 50:363-370, 1984.

These works axiomatically demonstrated that a PDE model of the linear heat dissipation or diffusion process has a unique solution of Gaussian convolution. More recent well-known diffusion-based methods include anisotropic diffusion for edge-preserving data smoothing as described in P. Perona and J. Malik. "Scale-Space and Edge Detection Using Anisotropic Diffusion". IEEE Trans. on PAMI, 12(7):629-639, 1990; and automatic scale selection with $\gamma$-normalized Laplacian as described in T. Lindeberg, "Feature Detection with Automatic Scale Selection", IJCV, 30(2):79-116, 1998. It also provides a theoretical foundation to other vision techniques such as Gaussian pyramids and SIFT feature detector as described in D. Lowe, "Distinctive Image Features from Scale-Invariant Keypoints," IJCV, 60(2), pp. 91-110, 2004.

Despite its ubiquitousness, to the best of our knowledge, this is the first attempt to exploit the diffusion process to compute a histogram distance.

Other histogram dissimilarity measures and an evaluation can be found in Y. Rubner, J. Puzicha, C. Tomasi, and J. M. Buhmann. "Empirical Evaluation of Dissimilarity Measures for Color and Texture", *CVIU*, 84:25-43, 2001. In this article, the authors also describe two other cross-bin distances: early work by Peleg et al., "A Unified Approach to the Change of Resolution: Space and Gray-level", *IEEE Trans. on PAMI*, 11:739-742, 1989; and a heuristic approach, quadratic form as described in W. Niblack, R. Barber, W. Equitz, M. Flickner, B. Glasman, D. Pektovic, P. Yanker, C. Faloutsos, and G. Taubin. 'The QBIC project: querying images by content using color, texture and shape". *In Proc. of SPIE Storage and Retrieval for Image and Video Databases*, pp. 173-187, 1993, and in J. Hafner, H. S. Sawhney, W. Equitz, M. Flickner, and W. Niblack. "Efficient color histogram indexing for quadratic form distance functions", *IEEE Trans. on PAMI*, 17(7):729-736, 1995.

Accordingly, a new and improved method and system for comparing histograms is needed.

SUMMARY OF THE INVENTION

Targeting this problem, a new dissimilarity distance between HBLDs, the diffusion distance, is presented. The new approach models the difference between two histograms as a temperature field and considers the diffusion process on the field. Then, the integration of a norm on the diffusion field over time is used as a dissimilarity measure between the histograms. For computational efficiency, a Gaussian pyramid is used to approximate the continuous diffusion process. The diffusion distance is then defined as the sum of norms over all pyramid layers. The new distance allows cross-bin comparison. This makes it robust to distortions such as deformation, lighting change and noise that often causes problems for HBLDs. Experimentally it was observed that the diffusion distance performs as well as EMD. On the other hand, due to the exponentially decreasing layer sizes in the Gaussian pyramid, the new approach has a linear time complexity that is much faster than previously used cross-bin distances with quadratic complexity or higher.

In accordance with one aspect of the present invention, a method of comparing a first histogram $h_1$ to a second histogram $h_2$ is provided. The method includes determining a diffusion distance that is a function of $h_1$, $h_2$ and a filter. In one embodiment the filter is a Gaussian filter.

In accordance with a further aspect of the present invention, the function is a temperature function $T(x,t)$ that is related to $h_1$ and $h_2$.

In accordance with another aspect of the present invention, $T(x,t)=T_0*\phi(x,t)$ where $\phi(x,t)$ is the Gaussian filter and $T_0(x,0)=h_1-h_2$. The Gaussian filter is preferably $$\phi(x,t) = \frac{1}{(2\pi)^{1/2}t}\exp\left\{-\frac{x^2}{2t^2}\right\}.$$

In accordance with yet another aspect of the present invention, the diffusion distance is $$K(h_1, h_2) = \sum_{l=0}^{L} k(|d_l(x)|),$$

wherein $d_0(x)=h_1(x)-h_2(x)$ and $d_l(x)=[d_{l-1}(x)*\phi(x,\sigma)]\downarrow_2$ and wherein L is a number of pyramid layers, $\sigma$ is the constant standard deviation for $\phi$ and $\downarrow_2$ denotes half size downsampling which is preferably accomplished.

In accordance with further aspects of the present invention, the diffusion distance can be used in shape matching processes, in image retrieval processes and/or in texture analysis processes.

The present invention further contemplates a processor based system with application software operable on the processor to perform the above stated methods.

In summary, the present invention relates to a diffusion distance to compare histograms. The process and system of the present invention is robust to distortion and quantization effects in comparing histogram-based local descriptors, and is much more efficient than previously proposed cross-bin approaches. In experiments on shape features (shape context, image features, shape context and spin image), the method of the present invention outperformed other state-of-the-art methods.

The present invention differs from the above cited works in several ways. First, the similarity between histograms with a diffusion process is modeled. Second, the focus is on comparing histogram-based local descriptors such as shape context as described in S. Belongie, J. Maliic and J. Puzicha. "Shape Matching and Object Recognition Using Shape Context", *IEEE Trans. on PAMI*, 24(24):509-522, 2002, and SIFT as described in D. Lowe, "Distinctive Image Features from Scale-Invariant Keypoints," *IJCV*, 60(2), pp. 91-110, 2004; while the above works focus on feature distributions in the image domain. The difference between the herein presented approach and the pyramid matching kernel as described in K. Grauman and T. Darrell. "The Pyramid Match Kernel; Discriminative classification with Sets of Image Features" *ICCV*, 2005; is explained in a section below. Previously, one of the inventors of the present invention presented a fast EMD algorithm, EMD-$L_1$ as described in H. Ling and D. W. Jacobs, "Using the Inner-Distance for classification of Articulated Shapes", *CVPR*, II:719-726, 2005, for histogram comparison. EMD-$L_1$ utilizes the special structure of the $L_1$ ground distance on histograms for a fast implementation of EMD. Therefore it still solves the transportation problem, which is fundamentally different from the motivation of the present invention. The diffusion distance is much faster than EMD-$L_1$ and performs similarly in the case of large deformations. However, in a preliminary experiment with only small quantization errors, EMD-$L_1$ performed better than the diffusion distance.

DESCRIPTION OF A PREFERRED EMBODIMENT

The Diffusion Distance Between Histograms—Modeling Histogram Difference with Diffusion Process The basis for the diffusion distance is now discussed. First consider 1D distributions $h_1(x)$ and $h_2(x)$. It is natural to compare them by their difference, denoted as $d(x)=h_1(x)-h_2(x)$. Instead of putting a metric on d directly, treat it as an isolated temperature field $T(x,t)$ at time $t=0$, i.e. $T(x, 0)=d(x)$. It is known that the temperature in an isolated field obeys the heat diffusion equation $$\frac{\partial T}{\partial t} = \frac{\partial^2 T}{\partial x^2}. \quad \text{(Eq. 1)}$$

It has a unique solution $$T(x,t)=T_0(x)*\phi(x,t) \quad \text{(Eq. 2)}$$

given initial condition $$T(x, 0)=T_0(x)=d(x) \quad \text{(Eq. 3)}$$

where $\phi(x,t)$ is a filter, which in one embodiment can be a Gaussian filter, with $$\phi(x, t) = \frac{1}{(2\pi)^{1/2}t}\exp\left\{-\frac{x^2}{2t^2}\right\} \quad \text{(Eq. 4)}$$

Note that the mean of the difference field is zero, therefore $T(x,t)$ becomes zero everywhere when t increases. In this sense, $T(x,t)$ can be viewed as a process of histogram value exchange which makes $h_1$ and $h_2$ equivalent. Intuitively, the process diffuses the difference between two histograms, therefore a dissimilarity can be extracted by measuring the process. A distance between $h_1$ and $h_2$ is defined as $$\hat{K}(h_1, h_2) = \int_0^{\bar{t}} k(|T(x, t)|)dt \quad \text{(Eq. 5)}$$

where $\bar{t}$ is a positive constant upper bound of the integration, which can be $\infty$ as long as the integration converges. $k(.)$ is a norm which measures how $T(x, t)$ differs from 0. It is preferred to use the $L_1$ norm because of its computational simplicity and good performance in the pilot studies.

Next it is shown how $\hat{K}$ handles the deformation with a simple 1D example.

Figure 1:
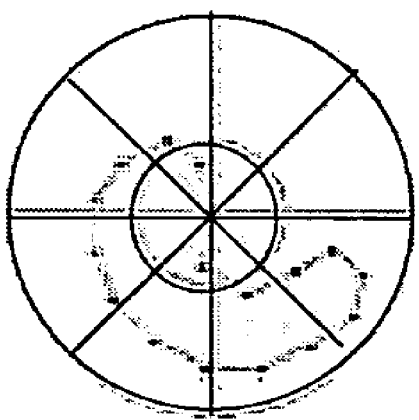
FIG. 1 shows three different shapes and their histograms.
Figure 1:
Figure 1:
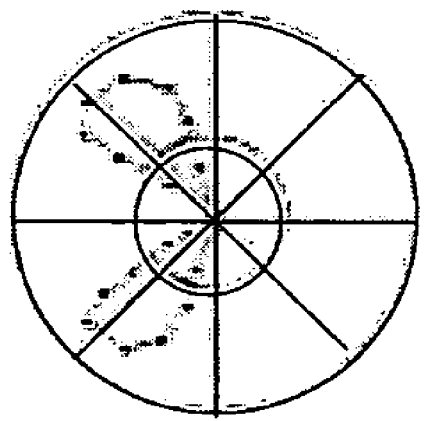
Figure 1:
Figure 1:
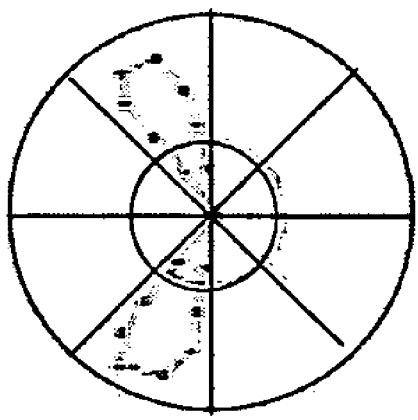
Figure 1:
Figure 2:
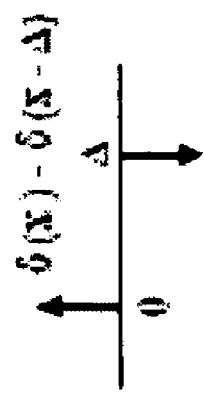
FIG. 2 is a diagram of two histograms with shift Δ between them and their difference.
Figure 2:
Figure 2:
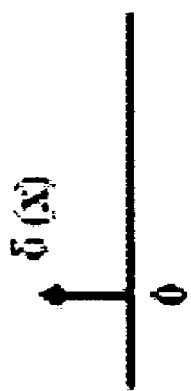

Assume a simple case where $h_1=\delta(x)$ and $h_2(x)=\delta(x-\Delta)$, as shown in FIG. 2. This means the histogram is shifted by $\Delta \geq 0$. The initial value of $T(x,t)$ is therefore $T_0=\delta(x)-\delta(x-\Delta)$, as shown in FIG. 2. The diffusion process becomes $$T(x,t)=(\delta(x)-\delta(x-\Delta))*\phi(x,t)=\phi(x,t)-\phi(x-\Delta,t) \quad \text{(Eq. 6)}$$

Use the $L_1$ norm for $k(.)$, $$\begin{aligned} k(|T(x, t)|) &= \int_{-\infty}^{\infty} |\phi(x, t) - \phi(x - \Delta, t)|dx \\ &= 2\int_{-\infty}^{-\Delta/2}(|\phi(x, t) - \phi(x - \Delta, t)|)dx \\ &= 2\left(2\int_{-\infty}^{-\Delta/2}\phi(x, t)dx - 1\right) \end{aligned} \quad \text{(Eq. 7)}$$

From Eq. 5 and Eq. 7, it is clear that $k(.)$ and $\hat{K}$ are monotonically increasing with $\Delta$. This suggests that $\hat{K}$ indeed measures the degree of deformation between two histograms.

Relation to the Earth Mover's Distance (EMD)

From above discussion, it is clear that $\hat{K}$ is a cross-bin distance, which allows comparison between bins at different locations. Its relation with EMD, which is another effective cross-bin histogram distance, is discussed here.

Given two histograms $h_1$ and $h_2$, EMD models $h_1$ as a set of supplies and $h_2$ as a set of demands. The minimum work to transport all supplies to demands is used as the distance between $h_1$ and $h_2$. In other words, EMD measures the dissimilarity between histograms with a transportation problem. See, Y. Rubner, C. Tomasi, and L. J. Guibas. "The Earth Mover's Distance as a Metric for Image Retrieval", *IJCV*, 40(2):99-121, 2000.

Note that bins of $h_1$ and $h_2$ share same lattice locations, which means that it takes zero work to transport supplies from a bin in $h_1$ to the same bin in $h_2$. This leads to an intuitive interpretation of EMD with the difference $d=h_1-h_2$: EMD is the minimum work of exchanging values in d to make d vanish everywhere.

This provides an intuition about the difference between EMD and $\hat{K}$. EMD seeks the exchanging scheme which has the minimum work, while $\hat{K}$ measures a more "natural" exchanging scheme, i.e. a diffusion process. While EMD has been successfully applied to several vision tasks (e.g. Y. Rubner, C. Tomasi, and L. J. Guibas. "The Earth Mover's Distance as a Metric for Image Retrieval", *IJCV*, 40(2):99-121, 2000 and K. Grauman and T. Darrell, "Fast Contour Matching Using Approximate Earth Mover's Distance", *CVPR*, 1:220-227, 2004) the diffusion-based distances have not been evaluated with any vision tasks. It is, however, believed that they may fit to different tasks. In experiments on the HBLDs suffering large deformation, both approaches perform quite similar. Below an example, in which $\hat{K}$ performs better than EMD is demonstrated.

Figure 3:
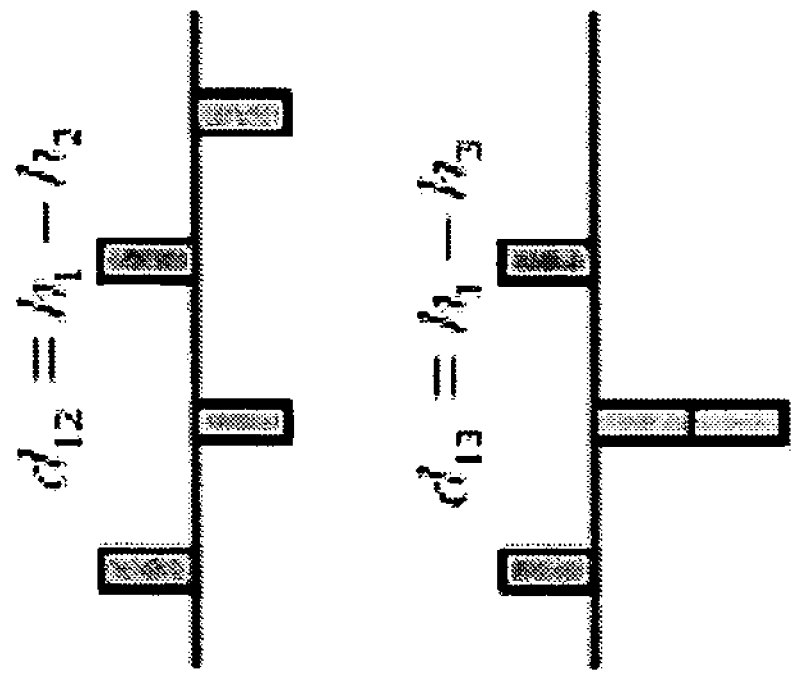
FIG. 3 is a diagram of three D1 histograms and the differences between them.
Figure 3:
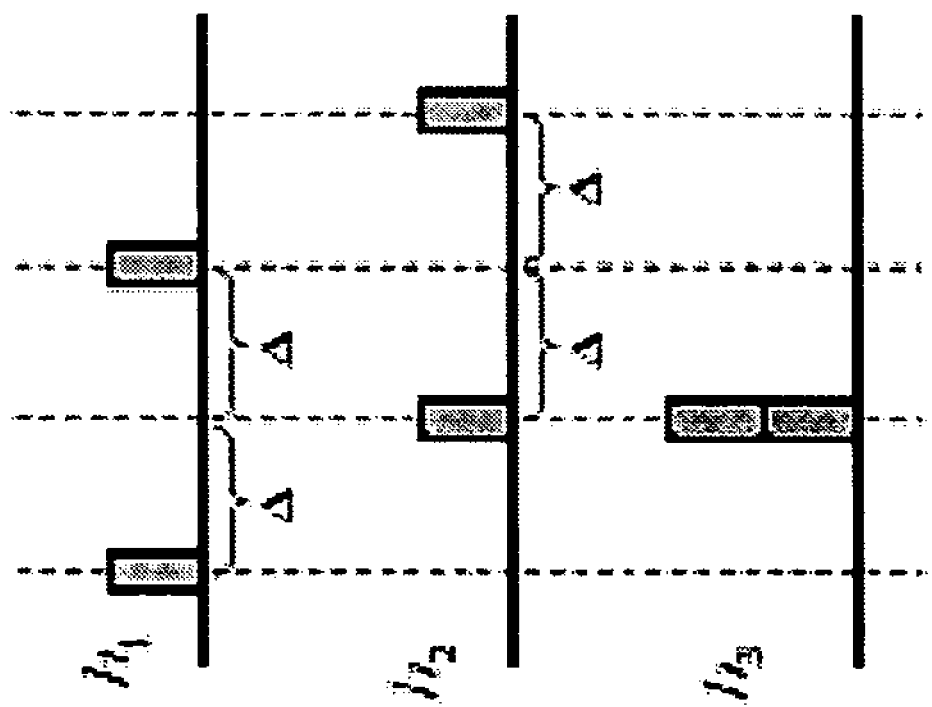

Consider three one dimensional histograms $h_1$, $h_2$ and $h_3$ as illustrated in the left of FIG. 3. $h_2$ is shifted from $h_1$ by $\Delta$, while $h_3$ has no explicit relationship to $h_1$. One wants to compare $h_1$ to $h_2$ and $h_3$. Subtracting $h_2$ and $h_3$ from $h_1$, one gets the differences $d_{12}, d_{13}$ as shown in the right of FIG. 3. It is clear that EMD between $h_1$ and $h_2$ are the same as EMD between $h_1$ and $h_3$. Perceptually, however, $h_1$ seems to be more similar to $h_2$ than to $h_3$.

Figure 4:
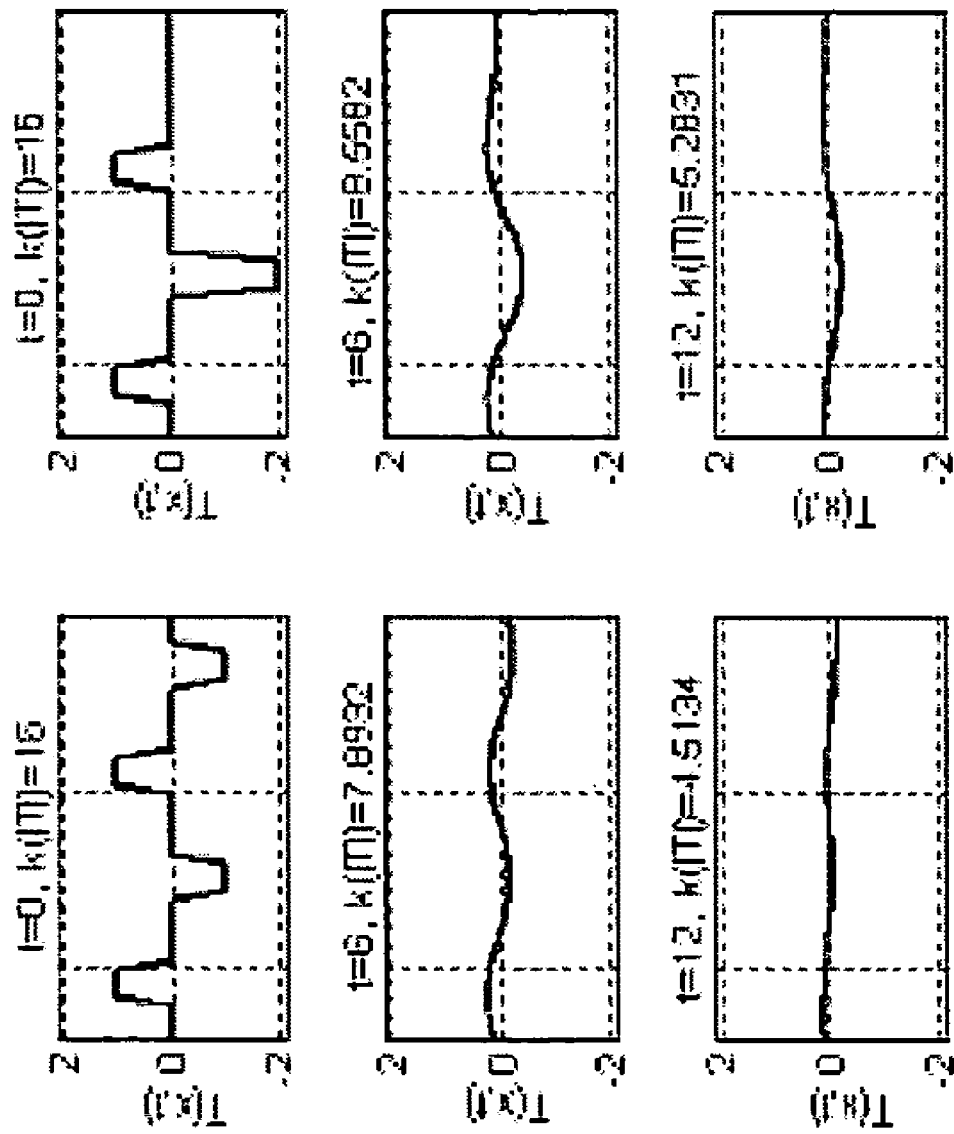
FIG. 4 show in diagram diffusion processes of histogram differences.
Figure 5:
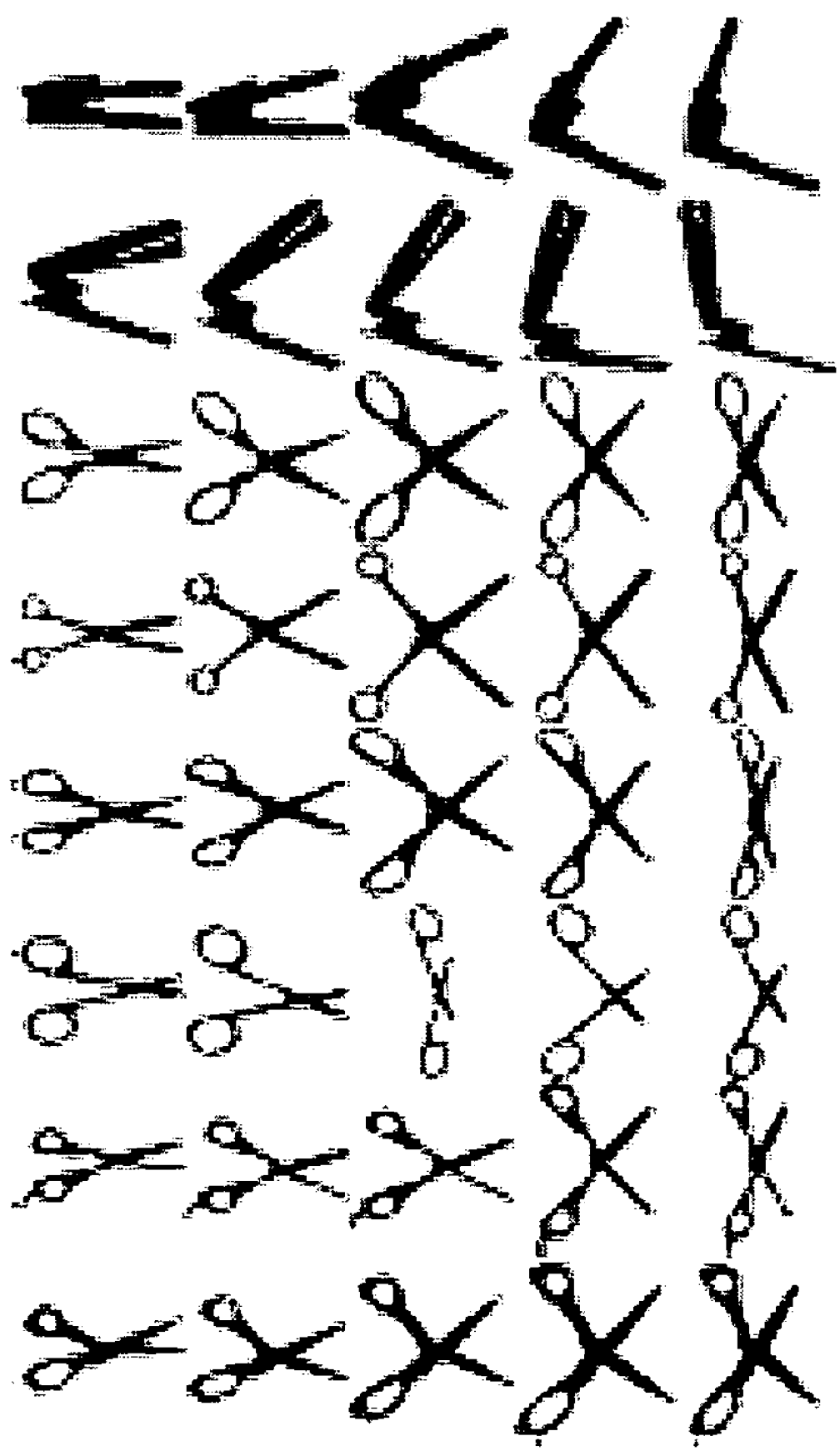
FIG. 5 comprises objects of a shape database with different articulations.

FIG. 4 shows the diffusion process $T(x, t)$ at $t=0, 6, 12$. From the figure it is seen that $k(|T(x,t)|)$ for $h_1$ and $h_2$ is always smaller than that for $h_1$ and $h_3$. Therefore, $\hat{K}(h_1,h_2) < \hat{K}(h_1,h_3)$. This is more consistent to our perception.

Diffusion Distance

It is straightforward to extend the previous discussions to higher dimensions. Consider two rn-dimensional histograms $h_1(x)$ and $h_2(x)$, where $x \in R^m$ is a vector. The definition of $\hat{K}(h_1,h_2)$ is the same as previously stated, except that equation (1) and (4) are replaced by following (8) and (9), respectively.

$$\frac{\partial T}{\partial t} = \nabla^2 T \qquad \text{(Eq. 8)}$$

$$\phi(x, t) = \frac{1}{(2\pi)^{m/2} t} \exp\left(-\frac{x^T x}{2t^2}\right) \qquad \text{(Eq. 9)}$$

Now the problem is how to compute $\hat{K}$. Direct computation of equation (7) is expensive. Instead, it is preferred to use an alternative distance function based on Gaussian pyramid. The Gaussian pyramid is a natural and efficient discretization of the continuous diffusion process $T(x,t)$. On the other hand, the Gaussian smoothing makes it safe to move from finer resolutions to coarser ones. With this idea, a diffusion distance is presented as $$K(h_1, h_2) = \sum_{l=0}^{L} |d_l(x)| \qquad \text{(Eq. 10)}$$

wherein $$d_0(x) = h_1(x) - h_2(x) \qquad \text{(Eq. 11)}$$

$$d_l(x) = [d_{l-1}(x) * \phi(x, \sigma)]\downarrow_2, \ l=1, \ldots, L \qquad \text{(Eq. 12)}$$

are different layers of the pyramid. L is a number of pyramid layers, σ is the constant standard deviation for the Guassian filter φ and $\downarrow_2$ denotes half size downsampling.

It is to be understood that a Gaussian filter in the context of the present invention is one embodiment of a filter that undertakes a diffusion process. Accordingly other filters than a Gaussian filter are contemplated that undertake a diffusion process as one aspect of the present invention.

Note that as long as k(.) is a metric, $K(h_1, h_2)$ forms a metric on histograms. In particular, for this invention, it is preferred to choose k(.) as the $L_1$ norm, which makes the diffusion distance a true metric. Equation (10) is then simplified as $$K(h_1, h_2) = \sum_{l=0}^{L} |d_l(x)| \qquad \text{(Eq. 13)}$$

The computational complexity of $K(h_1, h_2)$ is 0(N), where N is the number of histogram bins. This can be easily derived by two facts. First, the size of $d_l$ exponentially reduces. Second, only a small Gaussian filter φ is required which makes the convolution time linear in the size of $d_l$ for each scale 1.

Relation to the Pyramid Matching Kernel

The diffusion distance (Eq. 13) is similar to the pyramid matching kernel (PMK) recently proposed by Grauman and Darrell in that both methods compare histograms by summing the distances over all pyramid layers. See, K. Grauman and T. Darrell. "The Pyramid Match Kernel"; Discriminative classification with Sets of Image Features" ICCV, 2005.

The present approach focuses on histogram-based local descriptors, while PMK focuses on feature set matching. The two methods have following differences. First, when comparing each pyramid layer, PMK counts the number of newly matched feature pairs via the difference of histogram intersection. See, M. J. Swain and D. H. Ballard. "Color Indexing", IJCV, 7(1):11-32, 1991. This is particularly effective to handle occlusions for feature set matching. However, this is not an effective strategy for HBLDs because they are usually normalized. In contrast, the present invention employs $L_1$ norm to compare each pyramid layer.

Second, PMK uses varying weights for different scales by emphasizing finer scales more. This is reasonable for the set matching. However in the diffusion distance of the present invention, uniform weights are used. This seems more natural and performs better than non-uniform weights in the preliminary experiments.

Third, the diffusion distance uses Gaussian smoothing before downsampling according to the underlying diffusion process. Fourth, PMK requires random shifting when extracting histograms from feature sets to alleviate quantization effects. The method of the present invention avoids such an ad-hoc strategy by using the intuitive cross-bin referencing imposed by the well-formed diffusion.

Experiments

In this section, the diffusion distance is tested for two kinds of HBLDs. The first experiment is for shape features, where the diffusion distance is used to compare shape context as described in S. Belongie, J. Maliic and J. Puzicha. "Shape Matching and Object Recognition Using Shape Context", IEEE Trans. on PAMI, 24(24):509-522, 2002, in a data set with articulated objects. The second experiment is for interest point matching on a data set with synthetic deformation, illumination change and heavy noise. Both experiments demonstrate that the method here provided as one aspect of the present invention is robust for quantization problems.

Shape Matching with Shape Context

This section compares the diffusion distance for shape matching with shape context (SC) and the inner-distance shape context (IDSC). See, S. Belongie, J. Maliic and J. Puzicha. "Shape Matching and Object Recognition Using Shape context", IEEE Trans. on PAM!, 24(24):509-522, 2002 and H. Ling and D. W. Jacobs, "Using the Inner-Distance for classification of Articulated Shapes", CVPR, 11:719-726, 2005. Shape context is a shape descriptor that captures the spatial distribution of landmark points around every interest key point. IDSC is an extension of SC by using the shortest path distance for distance bins instead of Euclidean distance. In H. Ling and D. W. Jacobs, "Using the Inner-Distance for classification of Articulated Shapes", CVPR, 11:719-726, 2005, SC and IDSC are used for contour comparison with a dynamic programming (DP) scheme. The same framework is used herein, except for replacing the χ2 distance with the diffusion distance and EMD (with Rubner's code—see http://ai.stanford.edu/~rubner/emd/default.htm) for measuring dissimilarity between (inner-distance) shape contexts.

The experiment is conducted on an articulated shape database tested in H. Ling and D. W. Jacobs, "Using the Inner-Distance for classification of Articulated Shapes", CVPR, 11:719-726, 2005. The database contains 40 images from 8 different objects. Each object has 5 images articulated to different degrees (see FIG. 7). This data set is designed for testing articulation, which is a special and important case of deformation. H. Ling and D. W. Jacobs, "Using the Inner-Distance for classification of Articulated Shapes", CVPR, 11:719-726, 2005 shows that the original shape context with $\chi^2$ distance does not work well for these shapes. The reason is that the articulation causes a large deformation in the histogram.

Here, the same experimental setup as used in H. Ling and D. W. Jacobs, "Using the Inner-Distance for classification of Articulated Shapes", CVPR, 11:719-726, 2005 is used: 200 points are sampled along the outer contours of every shape; 5 log-distance bins and 12 orientation bins are used for shape context histograms. The same dynamic programming matchings are used to compute distances between pairs of shapes. The recognition result is evaluated as follows: For each image, the 4 most similar matches are chosen from other images in the dataset. The retrieval result is summarized as the number of 1st, 2nd, 3rd and 4th most similar matches that come from the correct object. Table 1 shows the retrieval results of using the shape context. It demonstrates that the diffusion distance works much better than the $\chi^2$ distance. The running time (in seconds) was not reported in H. Ling and D. W. Jacobs, "Using the Inner-Distance for classification of Articulated Shapes", *CVPR*, II:719-726, 2005 and is shown as N/A in Table 1.

TABLE 1

| Distance | Top 1 | Top 2 | Top 3 | Top 4 | Time |
| --- | --- | --- | --- | --- | --- |
| $\chi^2$ | 20/40 | 10/40 | 11/40 | 5/40 | N/A |
| EMD | 37/40 | 33/40 | 24/40 | 16/40 | 1355 s |
| Diffu. Dist. | 34/40 | 27/40 | 19/40 | 14/40 | 67 s |

Table 2 shows the results for inner-distance shape context. In this case, though the inner-distance is already insensitive to articulation, the diffusion distance still improves the result. From the tables we also see that the diffusion distance works similarly to EMD, while being more efficient.

TABLE 2

| Distance | Top 1 | Top 2 | Top 3 | Top 4 | Time |
| --- | --- | --- | --- | --- | --- |
| $\chi^2$ | 40/40 | 34/40 | 35/40 | 27/40 | N/A |
| EMD | 39/40 | 38/40 | 26/40 | 28/40 | 1143 s |
| Diffu. Dist. | 40/40 | 36/40 | 37/40 | 23/40 | 68 s |

Image Feature Matching

Figure 6:
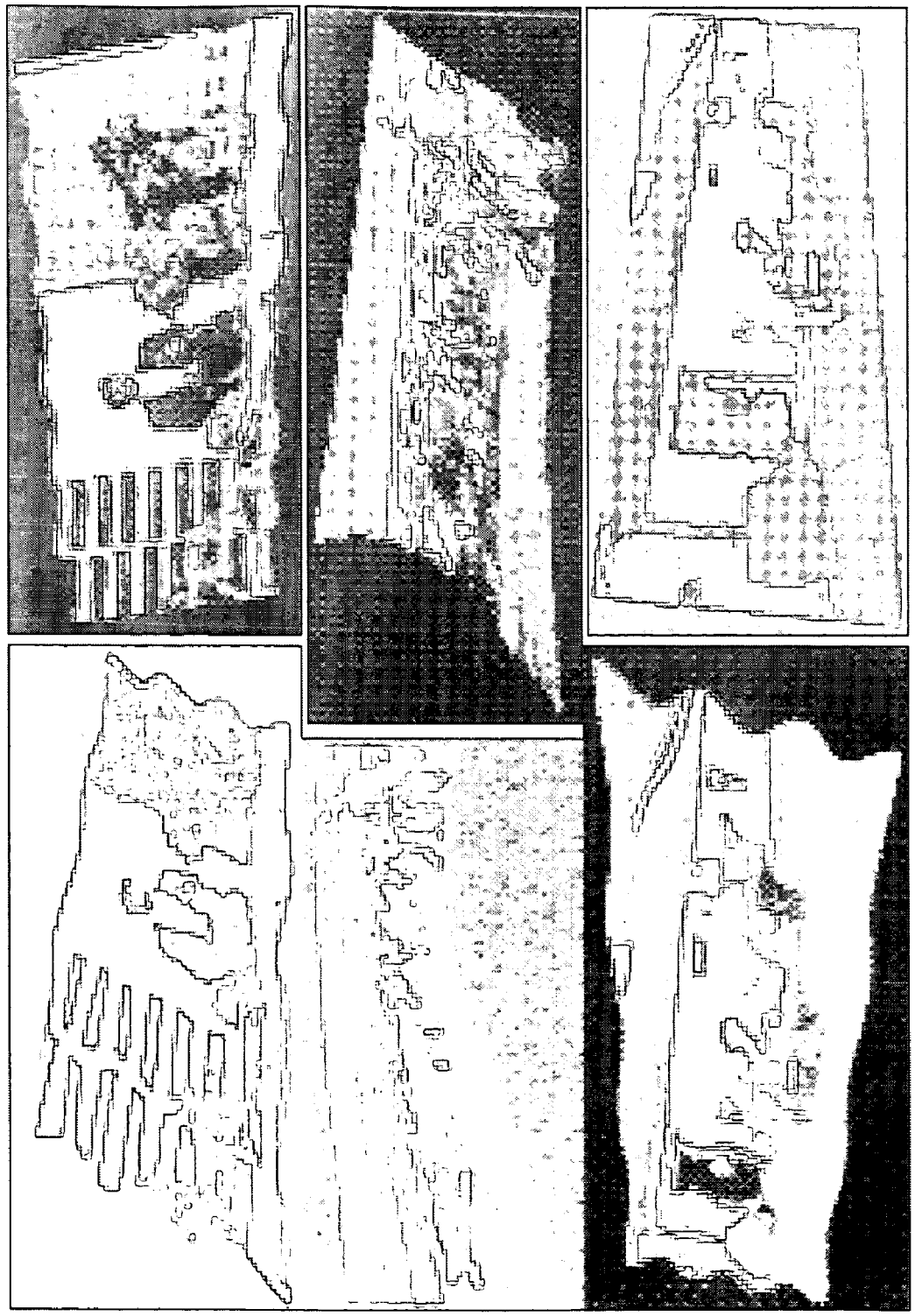
FIG. 6 shows some synthetic image pairs with synthetic deformation, illumination change and noise.
Figure 7:
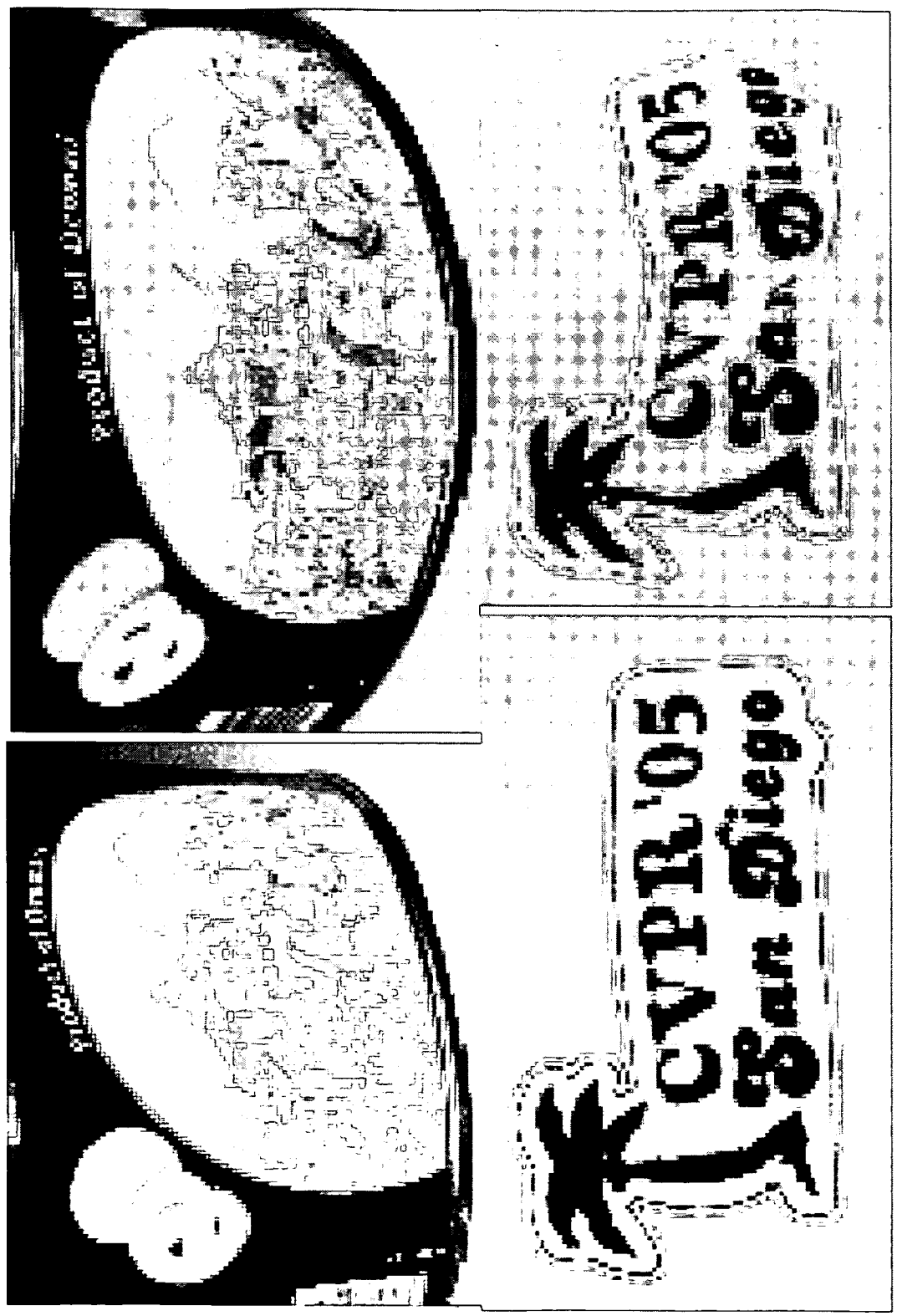
FIG. 7 shows real image pairs with deformation and lighting change.

This section describes the experiment for interest point matching with several state-of-the-art image descriptors. The experiment was conducted on two image data sets. The first data set contains ten image pairs with synthetic deformation, noise and illumination change. See FIG. 6 for some examples. The second one contains six image pairs with real deformation and lighting changes, some of them are shown in FIG. 7.

Dissimilarity measures. The diffusion distance was tested along with several popular bin-to-bin distances, as well as cross-bin distances. The bin-to-bin distances include the $\chi 2$ statistics, the symmetric Kullback-Leibler divergence (KL), symmetric Jensen-Shannon(JS) divergence as described in J. Lin. "Divergence measures based on the Shannon entropy". *IEEE Trans. Inform. Theory*, 37(1):145-151, 1991, $L_2$ distance and Bhattacharyya distance (BT). Cross-bin distances include EMD and quadratic form(QF). For EMD, Rubner's online code with L2 ground distance was used. For the quadratic form distance, it is implemented according to Y. Rubner, C. Tomasi, and L. J. Guibas. "The Earth Mover's Distance as a Metric for Image Retrieval", *IJCV*, 40(2):99-121, 2000. For the diffusion distance, the Gaussian standard deviation is set to $\sigma=0.5$ and a window of size 3×3(3×3×3 for 3D histograms) is used.

Interest point. Harris corners are used as described in C. Harris and M. Stephens, "A combined corner and edge detector", *Alvey Vision Conference*, 147-151, 1988 for the matching experiments. The reason for this choice is that, due to the large deformation, noise and lighting change, it is hard to apply other interest point detector. On the other hand, the focus is more on comparing descriptors than the interest points. For the synthetic data set, 300 points per image pair are picked with the largest cornerness responses. To compute the descriptors, a circular support region around each interest point is used. The region diameter is 41 pixels, which is similar to the setting used in K. Mikolajczyk and C. Schmid, "A Performance Evaluation of Local Descriptors," *IEEE Trans. on PAMI*, 27(10):1615-1630, 2005.

Descriptors. All the distances on three different histogram-based descriptors were tested. The first one is SIFT proposed by D. Lowe, "Distinctive Image Features from Scale-Invariant Keypoints," *IJCV*, 60(2), pp. 91-110, 2004. It is a weighted three dimensional histogram, 4 bins for each spatial dimension and 8 bins for gradient orientation. The second one is the shape context as described in S. Belongie, J. Maliic and J. Puzicha. "Shape Matching and Object Recognition Using Shape Context", *IEEE Trans. on PAMI*, 24(24):509-522, 2002. The shape context for images is extracted as a two dimensional histogram counting the local edge distribution in a similar way to K. Mikolajczyk and C. Schmid, "A Performance Evaluation of Local Descriptors," *IEEE Trans. on PAMI*, 27(10):1615-1630, 2005. In the experiment, 8 bins for distance are used and 16 bins for orientation. The third one is the spin image as described in S. Lazebnik, C. Schmid, and J. Ponce, "A sparse texture representation using affine-invariant regions," *IEEE Trans. PAMI*, 27(8):1265-1278, 2005 and A. Johnson, M. Hebert, "Using spin images for efficient object recognition in cluttered 3D scenes". *IEEE Trans. on PAMI*, 21(5):433-449, 1999, which measures the joint spatial and intensity distribution of pixels around interest points. Eight distance bins are used and 16 intensity bins.

Evaluation criterion. First the ground-truth correspondence for each pair of images with their interest points is found. This is done automatically for synthetic data set while manually for the real image pairs. Then, every interest point in Image 1 is compared with all interest points in Image 2 by comparing the SIFT extracted on them. An interest point $p_1$ in Image 1 is treated as a correct match of another point $p_2$ in Image 2 if the displacement of $p_1$ is within a fixed distance of $p_2$. The detection rate among the top N matches is used to study the performance. The detection rate r is defined similarly to K. Mikolajczyk and C. Schmid, "A Performance Evaluation of Local Descriptors," *IEEE Trans. on PAMI*, 27(10):1615-1630, 2005, as $$r = \frac{\text{\# correct matches}}{\text{\# possible matches}} \quad \text{(Eq. 14)}$$

Figure 8:
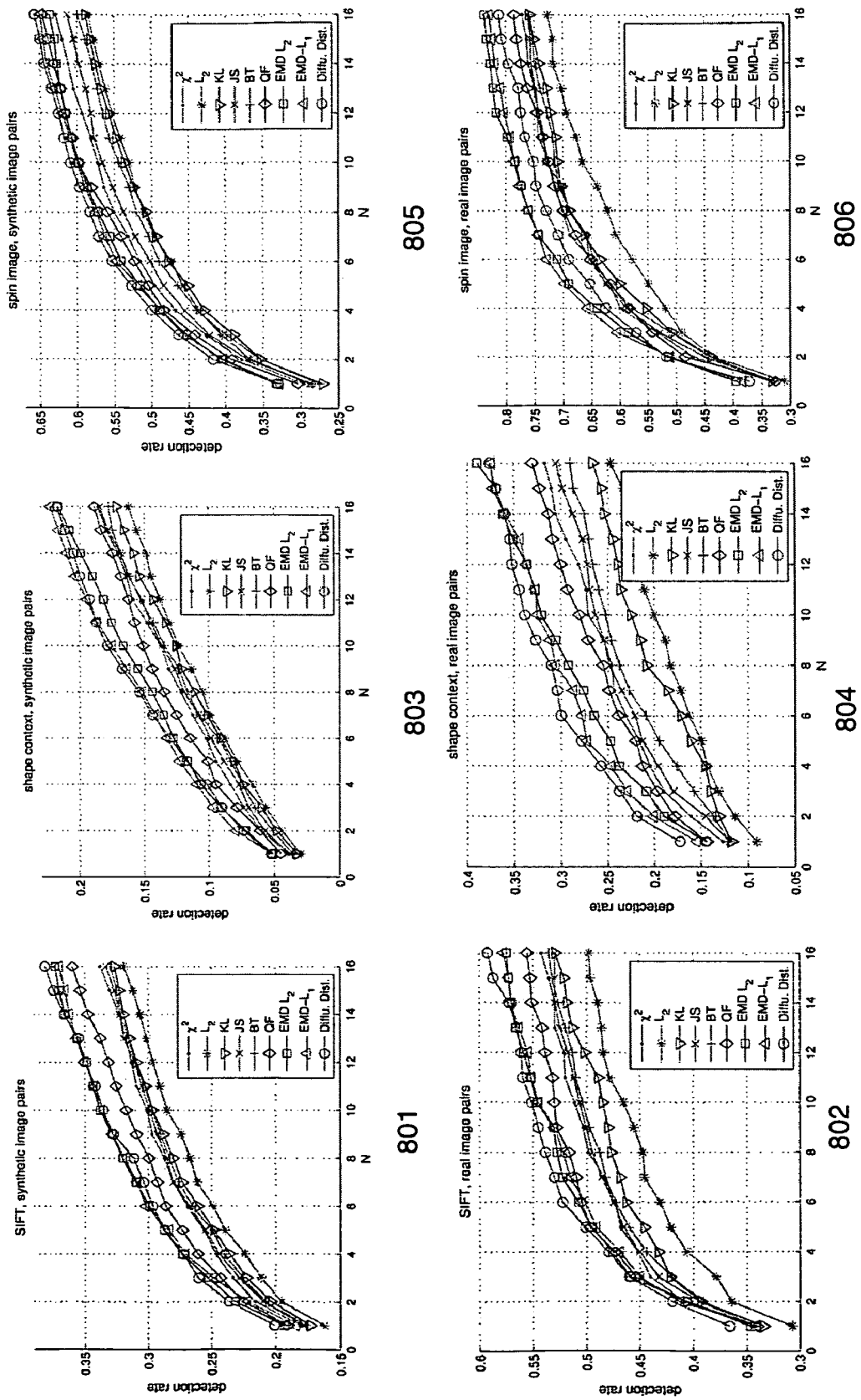
FIG. 8 has 6 ROC curves for interest point matching experiments.

Experiment results. A Receiver Operating Characteristic (ROC) based criterion is used to show the detection rates versus N that is the number of most similar matches allowed. The ROC curves on synthetic and real image pairs are shown in FIG. 8. In addition, the running time of each method is recorded. The average running time over image pairs is summarized in Tables 3 and 4. From these figures and tables, one can see that the cross-bin distances work better than bin-to-bin distances. EMD and the diffusion distance perform consistently better than the quadratic form.

Table 3 shows the average time (in seconds) for interest point matching between a synthetic image pair. SC is short for shape context and SI for spin image.

TABLE 3

| Approach | SIFT [14] | SC [2] | SI [10, 8] |
| --- | --- | --- | --- |
| $\chi^2$ | 0.1622 | 0.1812 | 0.1655 |
| $L_2$ | 0.044 | 0.0358 | 0.0438 |

TABLE 3-continued

| Approach | SIFT [14] | SC [2] | SI [10, 8] |
|---|---|---|---|
| KL | 0.636 | 0.9015 | 0.7344 |
| JS | 1.3643 | 1.3124 | 1.2 |
| BT | 0.1672 | 0.1576 | 0.1624 |
| QF | 16.5674 | 15.822 | 16.4327 |
| EMD | 2217.57 | 1761.99 | 2996.05 |
| Diffu. Dist. | 3.6952 | 0.4625 | 0.4925 |

Table 4 shows average time (in seconds) for interest point matching between a real image pair.

TABLE 4

| Approach | SIFT | SC | SI |
|---|---|---|---|
| $\chi^2$ | 0.039 | 0.04 | 0.042 |
| $L_2$ | 0.016 | 0.013 | 0.016 |
| KL | 0.133 | 0.198 | 0.175 |
| JS | 0.276 | 0.25 | 0.253 |
| BT | 0.037 | 0.037 | 0.034 |
| QF | 3.599 | 3.685 | 3.719 |
| EMD | 483.128 | 585.555 | 633.12 |
| Diffu. Dist. | 0.87 | 0.115 | 0.107 |

Referring to FIG. 8. FIG. 8 shows ROC curves for interest point matching experiments. The curves in the top row 801, 803 and 805 relate to synthetic image pairs and the curves in the bottom row 802, 804 and 806 to real image pairs. The first column (801 and 802) is for experiments with SIFT as described in D. Lowe, "Distinctive Image Features from Scale-Invariant Keypoints," IJCV, 60(2), pp. 91-110, 2004; the second column (803 and 804) for shape context as described in S. Belongie, J. Maliic and J. Puzicha. "Shape Matching and Object Recognition Using Shape Context", IEEE Trans. on PAMI, 24(24):509-522, 2002; and the third column (805 and 806) for spin image according to S. Lazebnik, C. Schmid, and J. Ponce, "A sparse texture representation using affine-invariant regions," IEEE Trans. PAMI, 27(8): 1265-1278, 2005 and A. Johnson, M. Hebert, "Using spin images for efficient object recognition in cluttered 3D scenes". IEEE Trans. on PAMI, 21(5):433-449, 1999.

Figure 9:
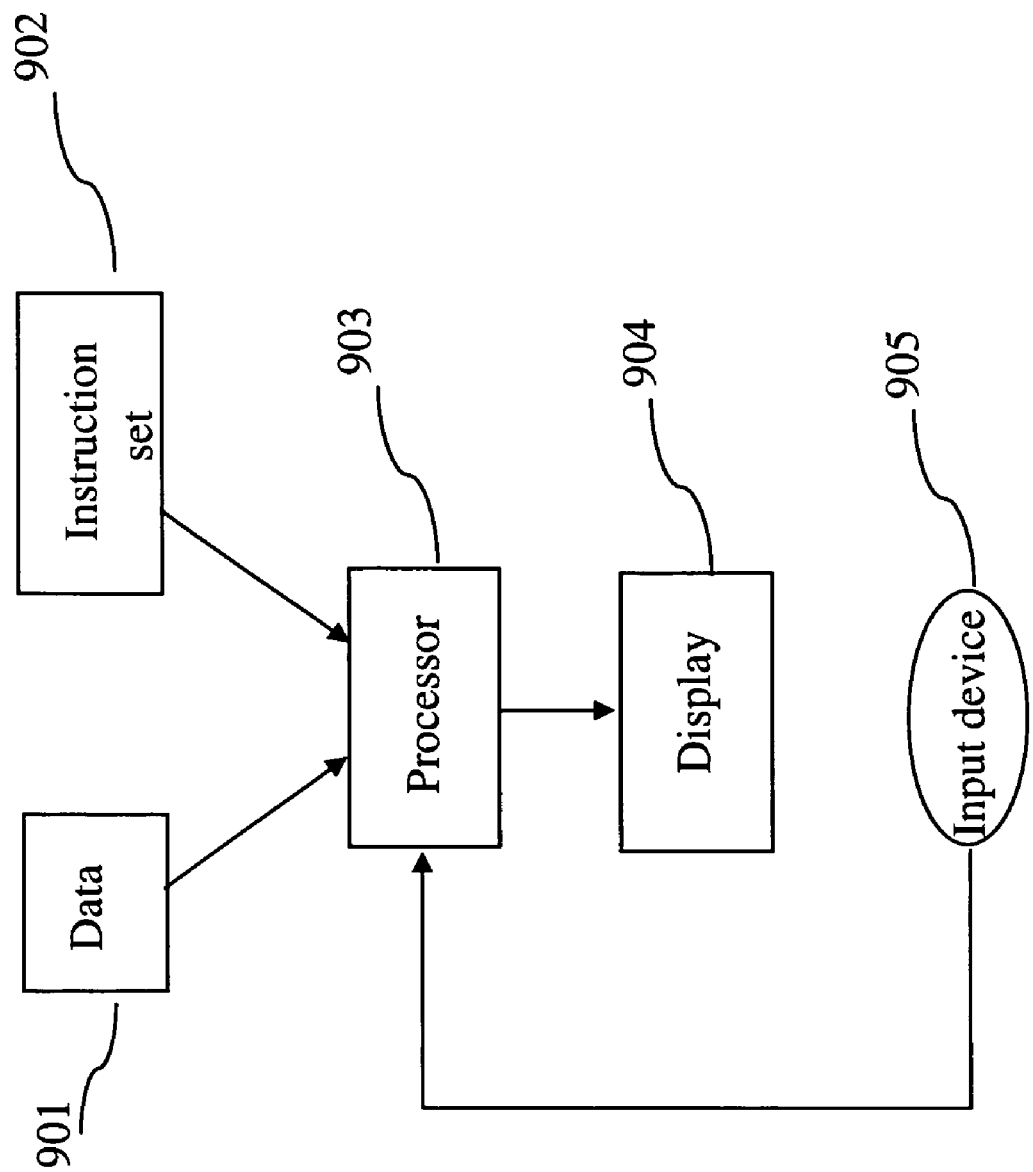
FIG. 9 is a diagram of a system according to one aspect of the present invention.

The methods for determining dissimilarity between histograms that are part of the present invention can be executed by a system as shown in FIG. 9. The system is provided with data 901 representing object data. An instruction set or program 902 executing the methods of the present invention is provided and combined with the data in a processor 903, which can process the instructions of 902 applied to the data 901 and output a result on an output device such as a display 904. The processor can be dedicated hardware. However, the processor can also be a CPU or any other computing device that can execute the instructions of 902. An input device 905 like a mouse, or track-ball or other input device may allow a user to select objects to be compared and to start the comparing process. Accordingly the system as shown in FIG. 9 provides a system for determining dissimilarity between histograms of objects.

The following references are generally descriptive of the background of the present invention and are hereby incorporated herein by reference: [1] Odaka, et al, "*EMD-$L_1$: An Efficient and Robust Algorithm for Comparing Histogram-Based Descriptors*", ECCV 2006 Submission 621, Supplied as additional material eccvo6.pdf; [2] S. Belongie, J. Malik and J. Puzicha. "Shape Matching and Object Recognition Using Shape Context", IEEE Trans. on PAMI, 24(24):509-522, 2002; [3] K. Grauman and T. Darrell, "Fast Contour Matching Using Approximate Earth Mover's Distance", CVPR, 1:220-227, 2004; [4] K. Grauman and T. Darrell. "The Pyramid Match Kernel; Discriminative classification with Sets of Image Features" ICCV, 2005; [5] J. Hafner, H. S. Sawhney, W. Equitz, M. Flickner, and W. Niblack. "Efficient color histogram indexing for quadratic form distance functions", IEEE Trans. on PAMI, 17(7):729-736, 1995; [6] C. Harris and M. Stephens, "A combined corner and edge detector", Alvey Vision Conference, 147-151, 1988; [7] P. Indyk and N. Thaper, "Fast Image Retrieval via Embeddings", In 3rd Workshop on Statistical and computational Theories of Vision, Nice, France, 2003; [8] A. Johnson, M. Hebert, "Using spin images for efficient object recognition in cluttered 3D scenes". IEEE Trans. on PAMI, 21(5):433-449, 1999; [9] J. J. Koenderink. "The structure of images", Biol. Cybern., 50:363-370, 1984; [10] S. Lazebnik, C. Schmid, and J. Ponce, "A sparse texture representation using affine-invariant regions," IEEE Trans. PAMI, 27(8):1265-1278, 2005; [11] J. Lin. "Divergence measures based on the Shannon entropy". IEEE Trans. Inform. Theory, 37(1):145-151, 1991; [12] T. Lindeberg. "Feature Detection with Automatic Scale Selection", IJCV, 30(2):79-116, 1998; [13] H. Ling and D. W. Jacobs, "Using the Inner-Distance for classification of Articulated Shapes", CVPR, II:719-726, 2005; [14] D. Lowe, "Distinctive Image Features from Scale-Invariant Keypoints," IJCV, 60(2), pp. 91-110, 2004; [15] K. Mikolajczyk and C. Schmid, "A Performance Evaluation of Local Descriptors," IEEE Trans. on PAMI, 27(10):1615-1630, 2005; [16] E. N. Mortensen, H. Deng, and L. Shapiro, "A SIFT Description with Global Context," CVPR, I:184-190, 2005; [17] W. Niblack, R. Barber, W. Equitz, M. Flickner, B. Glasman, D. Pektovic, P. Yanker, C. Faloutsos, and G. Taubin. 'The QBIC project: querying images by content using color, texture and shape". In Proc. of SPIE Storage and Retrieval for Image and Video Databases, pp. 173-187, 1993; [18] S. Peleg, M. Werman, and H. Rom. "A Unified Approach to the Change of Resolution: Space and Gray-level", IEEE Trans. on PAMI, 11:739-742, 1989; [19] P. Perona and J. Malik. "Scale-Space and Edge Detection Using Anisotropic Diffusion". IEEE Trans. on PAMI, 12(7):629-639, 1990; [20] Y. Rubner, J. Puzicha, C. Tomasi, and J. M. Buhmann. "Empirical Evaluation of Dissimilarity Measures for Color and Texture", CVIU, 84:25-43, 2001; [21] Y. Rubner, C. Tomasi, and L. J. Guibas. "The Earth Mover's Distance as a Metric for Image Retrieval", IJCV, 40(2):99-121, 2000; [22] M. J. Swain and D. H. Ballard. "Color Indexing", IJCV, 7(1):11-32, 1991; [23] A. Thayananthan, B. Stenger, P. H. S. Torr and R. Cipolla, "Shape Context and Chamfer Matching in Cluttered Scenes", CVPR, I: 1063-6919, 2003; and [24] A. P. Witkin. "Scale-space filtering", IJCAI, pp. 1019-1022, 1983.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method of comparing a first histogram $h_1$ to a second histogram $h_2$, comprising determining a diffusion distance that is a function of $h_1$, $h_2$ and a diffusion filter wherein the diffusion distance is $$K(h_1, h_2) = \sum_{l=0}^{L} k(|d_l(x)|),$$

wherein $d_0(x) = h_1(x) - h_2(x)$ and $d_l(x) = [d_{l-1}(x) * \phi(x, \sigma)]\downarrow_2$ and wherein L is a number of pyramid layers, σ is the constant standard deviation for φ and $\downarrow_2$ denotes half size downsampling.

2. The method as claimed in claim 1, wherein the diffusion filter is a Gaussian filter.

3. The method of claim 1, wherein the function is a temperature function T(x,t) that is related to $h_1$ and $h_2$.

4. The method of claim 3, wherein T(x,t)=$T_0$(x,0)*φ(x,t), where φ(x,t) is the Gaussian filter.

5. The method of claim 4, wherein $T_0$(x,0)=$h_1$–$h_2$.

6. The method of claim 4, wherein $$\phi(x, t) = \frac{1}{(2\pi)^{1/2}t}\exp\left\{-\frac{x^2}{2t^2}\right\}.$$

7. The method of claim 1, further comprising using the diffusion distance in a shape matching process.

8. The method of claim 1, further comprising using the diffusion distance in an image retrieval process.

9. The method of claim 1, further comprising using the diffusion distance in a texture analysis process.

10. A system for comparing a first histogram $h_1$ to a second histogram $h_2$, comprising:
  a processor; and
  application software operable on the processor to determine a diffusion distance that is a function of $h_1$, $h_2$ and a diffusion filter wherein the diffusion distance is $$K(h_1, h_2) = \sum_{l=0}^{L} k(|d_l(x)|),$$

wherein $d_o(x) = h_1(x) - h_2(x)$ and $d_l(x) = [d_{l-1}(x) * \phi(x, \sigma)]\downarrow_2$ and wherein L is a number of pyramid layers, σ is the constant standard deviation for φ and $\downarrow_2$ denotes half size downsampling.

11. The system as claimed in claim 10, wherein the diffusion filter is a Gaussian filter.

12. The system of claim 11, wherein the function is a temperature function T(x,t) that is related to $h_1$ and $h_2$.

13. The system of claim 12, wherein T(x,t)=$T_0$(x,0)*φ(x,t), where φ(x,t) is the Gaussian filter.

14. The system of claim 13, wherein $T_0$(x,0)=$h_1$–$h_2$.

15. The system of claim 13, wherein $$\phi(x, t) = \frac{1}{(2\pi)^{1/2}t}\exp\left\{-\frac{x^2}{2t^2}\right\}.$$

16. The system of claim 10, wherein the software application is further operable to use the diffusion distance in a shape matching process.

17. The system of claim 10, wherein the software application is further operable to use the diffusion distance in an image retrieval process.

18. The system of claim 10, wherein the software application is further operable to use the diffusion distance in a texture analysis process.

* * * * *